(12) United States Patent
Tardif et al.

(10) Patent No.: US 10,125,210 B2
(45) Date of Patent: Nov. 13, 2018

(54) MULTIBLOCK COPOLYMER, RUBBER COMPOSITION, AND TIRE

(71) Applicant: BRIDGESTONE CORPORATION, Tokyo (JP)

(72) Inventors: Olivier Tardif, Tokyo (JP); Shigeki Oishi, Hachioji (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 180 days.

(21) Appl. No.: 15/128,449

(22) PCT Filed: Feb. 24, 2015

(86) PCT No.: PCT/JP2015/000932
§ 371 (c)(1),
(2) Date: Sep. 23, 2016

(87) PCT Pub. No.: WO2015/166616
PCT Pub. Date: Nov. 5, 2015

(65) Prior Publication Data
US 2017/0101500 A1   Apr. 13, 2017

(30) Foreign Application Priority Data
May 2, 2014   (JP) .................................. 2014-095427

(51) Int. Cl.
| | | |
|---|---|---|
| *C08F 297/06* | (2006.01) | |
| *B60C 1/00* | (2006.01) | |
| *C08L 53/00* | (2006.01) | |
| *C08F 293/00* | (2006.01) | |
| *C08F 236/04* | (2006.01) | |

(52) U.S. Cl.
CPC .............. *C08F 297/06* (2013.01); *B60C 1/00* (2013.01); *C08F 293/00* (2013.01); *C08L 53/00* (2013.01); *C08F 236/04* (2013.01); *C08F 2410/04* (2013.01); *C08F 2500/11* (2013.01)

(58) Field of Classification Search
None
See application file for complete search history.

(56) References Cited

U.S. PATENT DOCUMENTS

| 4,645,793 A | 2/1987 | Von Hellens et al. |
| 2013/0211010 A1 | 8/2013 | Horikawa et al. |

FOREIGN PATENT DOCUMENTS

| CN | 103154061 A | 6/2013 |
| EP | 2 599 808 A1 | 6/2013 |
| EP | 2 599 809 A1 | 6/2013 |
| EP | 2 671 895 A1 | 12/2013 |
| EP | 2 671 897 A1 | 12/2013 |
| EP | 2 716 670 A1 | 4/2014 |
| JP | 2013-79338 A | 5/2013 |
| JP | 2013-133373 A | 7/2013 |
| JP | 2013-155291 A | 8/2013 |
| JP | 2013-155292 A | 8/2013 |
| JP | 2013-155297 A | 8/2013 |
| WO | 2012/014420 A1 | 2/2012 |
| WO | 2012/014457 A1 | 2/2012 |
| WO | 2012/164914 A1 | 12/2012 |

OTHER PUBLICATIONS

Communication dated Jan. 30, 2018 from State Intellectual Property Office of the P.R.C in counterpart application No. 201580022186.3.
International Search Report for PCT/JP2015/000932 dated Apr. 28, 2015.
Nagata, "Rubber composition used for crosslinked rubber for vibration-proof rubber for e.g. air spring, contains rubber components containing conjugated diene compond-nonconjugated olefin copolymer and conjugated diene-type polymer", Aug. 15, 2013, XP002767340, total 2 pages.
Yamamoto, "Composition for vibration-proof rubber, contains conjugated diene-type polymer, conjugated diene-non-conjugated olefin copolymer and non-conjugated diene-non-conjugated olefin copolymer, and crosslinking agent with peroxide", Aug. 15, 2013, XP002767338, total 2 pages.
Nagata, "Vibration-proof-rubber-composition-for -vibration-proof-rubber, contains bismaleimide compound, peroxide, zinc (meth)acrylic acid and rubber component having conjugated diene compound-nonconjugated olefin copolymer, in specified amount", Aug. 15, 2013, XP002767339, total 2 pages.

*Primary Examiner* — Catherine S Branch
(74) *Attorney, Agent, or Firm* — Sughrue Mion, PLLC

(57) ABSTRACT

A multiblock copolymer, obtainable by copolymerization of a conjugated diene compound and a non-conjugated olefin, wherein: a structure of the multiblock copolymer includes $A\text{-}(B\text{-}A)_x$ and/or $B\text{-}(A\text{-}B)_x$, wherein "A" represents a block portion constituted of monomer units of a non-conjugated olefin, "B" represents a block portion constituted of monomer units of a conjugated diene compound, and "x" represents an integer $\geq 1$; content of the non-conjugated olefin portion is $\leq 30$ mass %; and storage modulus G' at 130° C., measured by rubber process analysis using a rubber process analyzer, i.e. RPA, according to ASTM D6204, is $\geq 20$ kPa. It is possible to obtain vulcanized rubber and thus a tire having high fracture resistance and high weather resistance from the multiblock copolymer and a rubber composition derived therefrom.

6 Claims, No Drawings

MULTIBLOCK COPOLYMER, RUBBER COMPOSITION, AND TIRE

CROSS REFERENCE TO RELATED APPLICATIONS

This application is a National Stage of International Application No. PCT/JP2015/000932 filed Feb. 24, 2015, claiming priority based on Japanese Patent Application No. 2014-095427 filed May 2, 2014, the contents of all of which are incorporated herein by reference in their entirety.

TECHNICAL FIELD

The present invention relates to a multiblock copolymer, a rubber composition, and a tire.

BACKGROUND ART

Tires having high durability have been increasingly requested in recent years, responding to social demand for saving energy and resources. In view of these requests, there has been an increasing preference for a rubber material excellent in fracture resistance and weather resistance. In general, diene-based rubber such as butadiene rubber (BR), styrene-butadiene rubber (SBR), and the like are excellent in fracture resistance but do not have satisfactory weather resistance. Non diene-based rubber such as ethylene-propylene rubber (EPM), ethylene-propylene-diene rubber (EPDM), butyl rubber (IIR), and the like on the other hand are excellent in weather resistance but do not have satisfactory fracture resistance equivalent to diene-based polymer, thereby narrowing a range of applications thereof. Mixing diene-based rubber and non diene-based rubber in use has been attempted to achieve high fracture resistance and high weather resistance in a compatible manner (PTL 1) but fracture resistance does not satisfactorily improve in this case.

CITATION LIST

Patent Literature

PTL 1: U.S. Pat. No. 4,645,793

SUMMARY

In view of this, an object of the present disclosure is to provide: a multiblock copolymer and a rubber composition from which vulcanized rubber having high fracture resistance and high crack resistance can be obtained; and a tire having high fracture resistance and high crack resistance.

A multiblock copolymer of the present disclosure is a multiblock copolymer obtainable by copolymerization of a conjugated diene compound and a non-conjugated olefin, wherein:

a structure of the multiblock copolymer includes A-(B-A)$_x$ and/or B-(A-B)$_x$, wherein "A" represents a block portion constituted of monomer units of a non-conjugated olefin, "B" represents a block portion constituted of monomer units of a conjugated diene compound, and "x" represents an integer $\geq 1$;

content of the non-conjugated olefin portion is $\leq 30$ mass %; and storage modulus G' at 130° C., measured by rubber process analysis using a rubber process analyzer, i.e. RPA, according to ASTM D6204, is $\geq 20$ kPa.

According to the multiblock copolymer of the present disclosure, it is possible to obtain vulcanized rubber having high fracture resistance and high crack resistance.

In the multiblock copolymer of the present disclosure, provided that difference between storage modulus G' at 130° C. and storage modulus G' at 100° C., measured by rubber process analysis using a rubber process analyzer, i.e. RPA, according to ASTM D6204, is $G'_d$, $G'_d$ is preferably 100 kPa, more preferably 20 kPa$\leq G'_d \leq 100$ kPa, and further more preferably 20 kPa$\leq G'_d \leq 50$ kPa. Fracture resistance of resulting vulcanized rubber can be further enhanced by this structure.

A rubber composition of the present disclosure characteristically uses the aforementioned multiblock copolymer as a rubber component. According to the rubber composition of the present disclosure, it is possible to obtain vulcanized rubber having high fracture resistance and high weather resistance.

A tire of the present disclosure characteristically uses the aforementioned rubber composition. As a result, the tire has high fracture resistance and high weather resistance.

According to the present disclosure, it is possible to provide: a multiblock copolymer and a rubber composition from which vulcanized rubber having high fracture resistance and high weather resistance can be obtained; and a tire having high fracture resistance and weather resistance.

DETAILED DESCRIPTION

An embodiment of the present disclosure will be described hereinafter.

[Multiblock Copolymer]

A multiblock copolymer of the present disclosure is a multiblock copolymer obtainable by copolymerization of a conjugated diene compound and a non-conjugated olefin, wherein: a structure of the multiblock copolymer includes A-(B-A)$_x$ and/or B-(A-B)$_x$, wherein "A" represents a block portion constituted of monomer units of a non-conjugated olefin, "B" represents a block portion constituted of monomer units of a conjugated diene compound, and "x" represents an integer $\geq 1$; content of the non-conjugated olefin portion is $\leq 30$ mass %; and storage modulus G' at 130° C., measured by rubber process analysis using a rubber process analyzer, i.e. RPA, according to ASTM D6204, is $\geq 20$ kPa. Hereinafter, a "block portion A" constituted of monomer units of a non-conjugated olefin and a "block portion B" constituted of monomer units of a conjugated diene compound will occasionally be referred to as a "non-conjugated olefin block portion" and a "conjugated diene compound block portion", respectively.

Whether or not the copolymer is a multiblock copolymer having the A-(B-A)$_x$ structure and/or the B-(A-B)$_x$ structure, i.e. whether or not the copolymer has a block portion A constituted of monomer units of a non-conjugated olefin and a block portion B constituted of monomer units of a conjugated diene compound, can be confirmed by, for example, proving that the melting point of the multiblock copolymer determined from $^1$H-NMR spectrum data and/or differential scanning calorimetry (DSC) measurement according to JIS K7121: 1987 is equal to or lower than 120° C. The melting point of the multiblock copolymer can be controlled by adjusting content of a non-conjugated olefin block portion thereof having a long block chain length, i.e. large molecular weight. Specifically, the melting point of the multiblock copolymer can be controlled by, for example, controlling or changing conditions such as charging amounts of non-conjugated olefin monomers and/or conjugated diene compound monomers, the order of charging the respective monomers, the number of charging the respective monomers, and the like in a method for manufacturing a multiblock copolymer described below.

In the present disclosure, "content of a non-conjugated olefin portion" represents mass percent (mass %) of a block portion constituted of monomer units of a non-conjugated olefin in a multiblock copolymer. The multiblock copolymer can exhibit high weather resistance, while avoiding concentration of stress on a hard non-conjugated olefin portion, when it has a block portion constituted of monomer units of a non-conjugated olefin at mass percent in the range of >0 mass % and ≤30 mass %. Further, since the multiblock copolymer also has a block portion constituted of monomer units of a conjugated diene compound, the multiblock copolymer can function as elastomer and be subjected to crosslinking by sulfur, so that it successfully exhibits a high elongation at fracture and thus high fracture resistance.

Content of a non-conjugated olefin portion in the multiblock copolymer, which is not particularly restricted, can be determined by, for example: measuring $^{13}$C-NMR spectrum of the multiblock copolymer; and obtaining an integration ratio of a peak derived from a non-conjugated olefin block and a peak derived from a conjugated diene compound block, to calculate content of the non-conjugated olefin portion based on the integration ratio. The content of the non-conjugated olefin portion can be controlled by, for example, controlling charging amounts of non-conjugated olefin monomers and/or conjugated diene compound monomers in a method for manufacturing a multiblock copolymer described below.

In the present disclosure, storage modulus G' at 130° C. of the multiblock copolymer, which is measured by rubber process analysis using a rubber process analyzer (RPA) according to ASTM D6204 and will occasionally be referred to simply as "storage modulus G' at 130° C." hereinafter, varies depending on the content of a block having molecular weight (MW) of ≥50,000 among block portions constituted of monomer units of a non-conjugated olefin. Accordingly, the multiblock copolymer "having storage modulus G' at 130° C.≥20 kPa" represents the multiblock copolymer "having a non-conjugated olefin block portion of MW≥50,000 by certain content or more". The multiblock copolymer of the present disclosure, having a non-conjugated olefin block portion of MW≥50,000 by certain content or more, can have high fracture resistance because a non-conjugated olefin block portion of MW≥50,000 having a long block chain length exhibits static crystallinity. Storage modulus G' at 130° C. of the multiblock copolymer can be controlled by adjusting the content of a non-conjugated olefin block having molecular weight of ≥50,000. Specifically, storage modulus G' at 130° C. of the multiblock copolymer can be controlled by, for example, adjusting charging amounts of non-conjugated olefin monomers and/or conjugated diene compound monomers, the order of charging the respective monomers, the manner of charging the respective monomers, and the like in a method for manufacturing a multiblock copolymer described below.

As described above, according to the multiblock copolymer of the present disclosure, it is possible to obtain vulcanized rubber having high fracture resistance and high weather resistance when the vulcanized rubber is manufactured by using the multiblock copolymer.

In our multiblock copolymer of the present disclosure, provided that difference between storage modulus G' at 130° C. and storage modulus G' at 100° C. (which will occasionally be referred to simply as "storage modulus G' at 100° C." hereinafter), measured by rubber process analysis using a rubber process analyzer (RPA) according to ASTM D6204, is $G'_d$, $G'_d$ is preferably ≤100 kPa, more preferably 20 kPa≤$G'_d$≤100 kPa, and further more preferably 20 kPa≤$G'_d$≤50 kPa. Storage modulus G' at 100° C., measured by rubber process analysis using a RPA according to ASTM D6204, varies depending on the content of a block having a short block chain length and molecular weight (MW) in the range of 100≤MW<50,000 among the block portions constituted of monomer units of a non-conjugated olefin. Storage modulus G' at 130° C. on the other hand varies depending on the content of a non-conjugated olefin block portion having molecular weight ≥50,000, as described above. Accordingly, it is possible to approximately determine a ratio of the content of a non-conjugated olefin block having molecular weight (MW) in the range of 100≤MW<50,000 and the content of a non-conjugated olefin block having molecular weight ≥50,000, based on the difference between storage modulus G' at 130° C. and storage modulus G' at 100° C. It is preferable that storage modulus G' at 100° C. is higher than storage modulus G' at 130° C. because inclusion of a non-conjugated olefin block portion having a short block length and molecular weight (MW) in the range of 100≤MW<50,000 by certain content or more in the multiblock copolymer reliably prevents crack generation due to stress concentration and/or orientation of crystals in a non-conjugated olefin block having a long block length therein from occurring. Setting the difference between storage modulus G' at 130° C. and storage modulus G' at 100° C. to be ≥20 kPa more reliably prevents crack generation due to stress concentration and/or orientation of crystals in a non-conjugated olefin block having a long block length in the multiblock copolymer. Setting the difference between storage modulus G' at 130° C. and storage modulus G' at 100° C. to be ≤100 kPa ensures good improvement of fracture resistance by satisfactory presence of a non-conjugated olefin block portion having a long block length and molecular weight 50,000 and exhibiting static crystallinity.

Our multiblock copolymer preferably has weight average molecular weight (Mw) in terms of polystyrene preferably in the range of 50,000 to 1,000,000 and more preferably in the range of 300,000 to 500,000, although the Mw is not particularly limited thereto. The weight average molecular weight in terms of polystyrene ≥50,000 ensures high fracture resistance of the multiblock copolymer. The weight average molecular weight in terms of polystyrene ≤1,000,000 ensures good workability, as well as high fracture resistance, of the multiblock copolymer. Weight average molecular weight in terms of polystyrene can be determined by gel permeation chromatography (GPC) by using polystyrene as the standard substance. Weight average molecular weight in terms of polystyrene, of the multiblock copolymer, can be controlled by, for example, changing conditions such as reaction time for copolymerization, type of a prompter, and the like in a method for manufacturing a multiblock copolymer described below.

Boundaries between respective block portions (A-B), (B-A) need not be clearly distinguished in the multiblock copolymer. Accordingly, for example, a portion constituted of a mixture of a conjugated diene compound and a non-conjugated olefin, e.g. a random structure and/or a taper structure, may be formed between a block portion A and a block portion B. Further, type, composition and the like of monomers constituting one block portion may be different from those constituting another block portion among block portions belonging to the same category (A or B).

Examples of a conjugated diene compound include 1,3-butadiene, isoprene, 1,3-pentadiene, 2,3-dimethylbutadiene, and the like, without being particularly limited thereto. 1,3-butadiene and isoprene are preferable among these examples. These examples of the conjugated diene compounds may be used either solely or in combination of two or more types.

Examples of a non-conjugated olefin include α-olefins such as ethylene, propylene, 1-butene, 1-pentene, 1-hexene, 1-heptene, and 1-octene. Ethylene, propylene, and 1-butene are preferable among these examples. These examples of the non-conjugated olefin may be used either solely or in combination of two or more types. An "olefin" represents an aliphatic unsaturated hydrocarbon compound having at least one carbon-carbon double bond.

Our multiblock copolymer can be manufactured by, for example, a first manufacturing method or a second manufacturing method described below.

[First Method for Manufacturing Multiblock Copolymer]

A first method for manufacturing our multiblock copolymer characteristically includes copolymerizing a conjugated diene compound with a non-conjugated olefin under the presence of any of first to third polymerization catalyst compositions or a polymerization catalyst. Any polymerization method such as solution polymerization, suspension polymerization, liquid-phase bulk polymerization, emulsion polymerization, vapor-phase polymerization, or solid-phase polymerization can be used as a copolymerization method in the first method for manufacturing our multiblock copolymer. Any solvent can be used when a solvent is to be used in the copolymerization reaction as long as the solvent is inactive in the copolymerization reaction. Examples of such a solvent as described above include toluene, hexane, cyclohexane, and a mixture thereof.

<First Polymerization Catalyst Composition>

A first polymerization catalyst composition is a polymerization catalyst composition containing at least one type of complex selected from the group consisting of:

a metallocene complex represented by following general formula (I)

(In formula (I). M represents lanthanoid, scandium or yttrium; $Cp^R$s each independently represent unsubstituted/substituted indenyl; $R^a$ to $R^f$ each independently represent a $C_{1-3}$ alkyl group or hydrogen atom; L represents a neutral Lewis base; and w represents an integer in the range of 0 to 3);

a metallocene complex represented by following general formula (II)

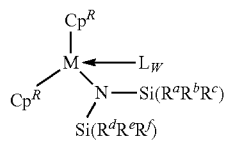

(In formula (II), M represents lanthanoid, scandium or yttrium; $Cp^R$s each independently represent unsubstituted/substituted indenyl; X' represents hydrogen atom, halogen atom, alkoxide, thiolate, amide, silyl, or a $C_{1-20}$ hydrocarbon group; L represents a neutral Lewis base; and w represents an integer in the range of 0 to 3); and a half metallocene cation complex represented by following general formula (III)

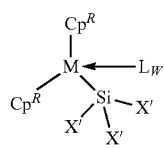

(In formula (III), M represents a lanthanoid element, scandium or yttrium; $Cp^{R'}$ represents unsubstituted/substituted cyclopentadienyl, indenyl or fluorenyl; X' represents hydrogen atom, halogen atom, alkoxide, thiolate, amide, silyl, or a $C_{1-20}$ hydrocarbon group; L represents a neutral Lewis base; and w represents an integer in the range of 0 to 3; and $[B]^-$ represents a non-coordinating anion).

The first polymerization catalyst composition may further include other components included in a conventional metallocene complex-containing polymer catalyst composition, e.g. a prompter. In the present disclosure, a "metallocene complex" represents a complex compound in which at least one cyclopentadienyl or derivative thereof is bonded to a core metal. In this connection, a metallocene complex in which only a single cyclopentadienyl or derivative thereof is bonded to a core metal may occasionally be referred to as a "half metallocene complex" in particular.

The concentration of the complex contained in the first polymerization catalyst composition is preferably in the range of 0.1 mol/L to 0.0001 mol/L in the polymerization reaction system.

$Cp^R$s are unsubstituted/substituted indenyls in the metallocene complexes represented by general formula (I) and general formula (II). $Cp^R$ having an indenyl ring as the base skeleton may be represented as $C_9H_{7-X}R_X$ or $C_9H_{11-X}R_X$, wherein X is an integer in the range of 0 to 7 or 0 to 11; Rs preferably each represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like. Specific examples of the substituted indenyl include 2-phenylindenyl, 2-methylindenyl, and the like. $Cp^R$s in general formula (I) and general formula (II) may be of either the same type or different types.

$Cp^{R'}$ is unsubstituted/substituted cyclopentadienyl, indenyl, fluorenyl group in the half metallocene cation complex represented by general formula (III). Unsubstituted/substituted indenyl group is preferable as $Cp^{R'}$ among these examples. $Cp^{R'}$ having a cyclopentadienyl ring as the base skeleton is represented as $C_5H_{5-X}R_X$, wherein X is an integer in the range of 0 to 5; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like. Specific examples of $Cp^{R'}$ having a cyclopentadienyl ring as the base skeleton include compounds represented by the following structural formulae:

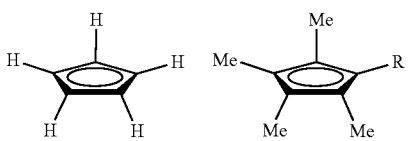

(In these structural formulae, R represents hydrogen atom, methyl or ethyl group.)

$Cp^{R'}$ having an indenyl ring as the base skeleton, as well as preferable examples thereof, in general formula (III) is defined in the same manner as $Cp^R$ in general formula (I).

$Cp^{R'}$ having a fluorenyl ring as the base skeleton in general formula (III) is represented as $C_{13}H_{9-X}R_X$ or $C_{13}H_{17-X}R_X$, wherein X is an integer in the range of 0 to 9 or 0 to 17; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like.

The core metal M in each of general formulae (I), (II) and (III) is a lanthanoid element, scandium or yttrium. The lanthanoid elements include fifteen elements having atomic numbers 57-71 in the periodic table and any of these elements is acceptable. Preferable examples of the core metal M include samarium Sm, neodymium Nd, praseodymium Pr, gadolinium Gd, cerium Ce, holmium Ho, scandium Sc, and yttrium Y.

The metallocene complex represented by general formula (I) includes a silylamide ligand [—$N(SiR_3)_2$]. R groups included in the silylamide ligand (i.e. $R^a$ to $R^f$ in general formula (I)) each independently represent a $C_{1-3}$ alkyl group or a hydrogen atom. It is preferable that at least one of $R^a$ to $R^f$ is a hydrogen atom. The catalyst can be easily synthesized and a non-conjugated olefin is easily introduced due to relatively little hindrance around the silicon atom when at least one of $R^a$ to $R^f$ is a hydrogen atom. For similar reasons, it is more preferable that at least one of $R^a$ to $R^c$ is a hydrogen atom and at least one of $R^d$ to $R^f$ is a hydrogen atom. Methyl group is preferable as the alkyl group.

The metallocene complex represented by general formula (II) includes a silyl ligand [—$SiX'_3$]. X' groups included in the silyl ligand [—$SiX'_3$], as well as preferable examples thereof, are defined in the same manner as X group in general formula (III) described below.

In general formula X is a group selected from the group consisting of hydrogen atom, halogen atom, alkoxide, thiolate, amide, silyl, and a $C_{1-20}$ hydrocarbon groups. Examples of the alkoxide group include: aliphatic alkoxy group such as methoxy, ethoxy, propoxy, n-butoxy, isobutoxy, sec-butoxy, tert-butoxy, and the like; and aryl oxide group such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy is preferable as the alkoxide group among these examples.

Examples of the thiolate group represented by X in general formula (III) include: aliphatic thiolate group such as thiomethoxy, thioethoxy, thiopropoxy, n-thiobutoxy, thiobutoxy, sec-thiobutoxy, tert-thiobutoxy, and the like; and arylthiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like. 2,4,6-triisopropylthiophenoxy is preferable as the thiolate group among these examples.

Examples of the amide group represented by X in general formula (III) include: aliphatic amide group such as dimethyl amide, diethylamide, diisopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-butyl-6-neopentylphenylamide, 2-isopropyl-6-neopentylphenylamide, 2,4,6-tri-tert-butylphenylamide, and the like; and bis(trialkylsilyl)amide such as bis(trimethylsilyl)amide and the like. Bis(trimethylsilyl)amide is preferable as the amide group among these examples.

Examples of the silyl group represented by X in general formula (III) include trimethylsilyl, tris(trimethylsilyl)silyl, bis(trimethylsilyl)methylsilyl, trimethylsilyl(dimethyl)silyl, (triisopropylsilyl)bis(trimethylsilyl)silyl, and the like. Tris(trimethylsilyl)silyl is preferable as the silyl group among these examples.

Acceptable examples of the halogen atom represented by X in general formula (III) include fluorine, chlorine, bromine and iodine atoms. Chlorine or bromine atom is preferable. Specific examples of the $C_{1-20}$ hydrocarbon group represented by X in general formula (III) include: normal/branched aliphatic hydrocarbon group such as methyl, ethyl, n-propyl, isopropyl, n-butyl, isobutyl, sec-butyl, tert-butyl, neopentyl, hexyl, octyl; aromatic hydrocarbon group such as phenyl, tolyl, naphthyl; aralykyl group such as benzyl; a hydrocarbon group containing silicon atom such as trimethylsilylmethyl, bis(trimethylsilyl)methyl; and the like. Methyl, ethyl, isopropyl, trimethylsilylmethyl, and the like are preferable as the $C_{1-20}$ hydrocarbon group among these examples.

Bistrimethylsilylamide or a $C_{1-20}$ hydrocarbon group is preferable as X in general formula (III).

Examples of the non-coordinating anion represented by $[B]^-$ in general formula (III) include quadrivalent boron anion. Specific examples of the quadrivalent boron anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

The metallocene complexes represented by general formulae (I) and (II) and the half metallocene cation complex represented by general formula (III) each further include 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

The metallocene complexes represented by general formulae (I) and (II) and the half metallocene cation complex represented by general formula (III) may each exist as any of monomer, dimer or another type of multimer.

The metallocene complex represented by general formulae (I) can be obtained by, for example, reacting lanthanoid trishalide, scandium trishalide or yttrium trishalide with an indenyl salt (such as potassium or lithium indenyl salt) and a bis(trialkylsilyl)amide salt (such as potassium or lithium salt of bis(trialkylsilyl)amide) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallocene complex represented by general formula (I) is shown below.

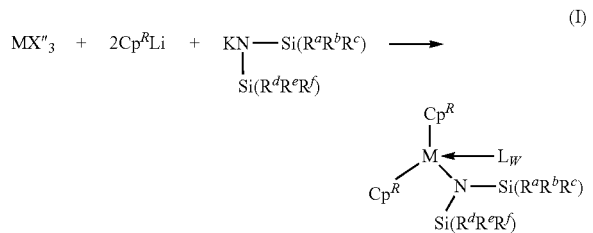

(In the reaction example above, X" represents a halide.)

The metallocene complex represented by general formulae (II) can be obtained by, for example, reacting lanthanoid trishalide, scandium trishalide or yttrium trishalide with an indenyl salt (such as potassium or lithium indenyl salt) and a silyl salt (such as potassium or lithium silyl salt) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallocene complex represented by general formula (II) is shown below.

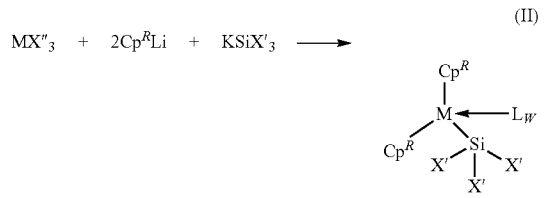

(In the reaction example above, X" represents a halide.)

The half metallocene cation complex represented by general formulae (III) can be obtained, for example, by a reaction shown below.

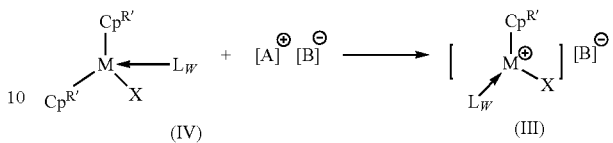

In the compound represented by general formula (IV), M represents a lanthanoid element, scandium or yttrium; $Cp^{R'}$'s each independently represent unsubstituted/substituted cyclopentadienyl, indenyl or fluorenyl; and X represents hydrogen atom, halogen atom, alkoxide, thiolate, amide, silyl, or a $C_{1-20}$ hydrocarbon group. L represents a neutral Lewis base and w represents an integer in the range of 0 to 3. $[A]^+$ represents a cation and $[B]^-$ represents a non-coordinating anion in an ionic compound represented by $[A]^+[B]^-$.

Examples of the cation represented by $[A]^+$ include carbonium cation, oxonium cation, amine cation, phosphonium cation, cycloheptatrienyl cation, ferrocenium cation having transition metal, and the like. Examples of the carbonium cation include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation. Examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation; and dialkylammonium cation such as diisopropylammonium cation, dicyclohexylammonium cation, and the like. Examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation or carbonium cation is preferable and N,N-dialkylanilinium cation is particularly preferable as $[A]^+$ among these examples.

The ionic compound represented by general formula $[A]^+[B]^-$ for use in the aforementioned reaction is, for example, a compound obtained by combining a non-coordinating anion and a cation respectively selected from the aforementioned examples and preferably N,N-dimethylanilinium tetrakis(pentafluorophenyl)borate, triphenylcarbonium tetrakis(pentafluorophenyl)borate, and the like. The ionic compound represented by general formula $[A]^+[B]^-$ is added to the compound represented by general formula (IV) by an amount preferably 0.1 to 10 times in mole ratio, more preferably approximately 1 times in mole ratio, as much as the amount of the compound represented by general formula (IV). In the case where the half metallocene cation complex represented by general formula (III) is used for a polymerization reaction, the half metallocene cation complex represented by general formula (III) may be directly provided into a polymerization reaction system or, alternatively, the half metallocene cation complex represented by general formula (III) may be formed in a polymerization reaction system by providing a compound represented by general formula (IV) and the ionic compound represented by general formula $[A]^+[B]^-$ for use in the aforementioned reaction, separately, in the polymerization reaction system. Further alternatively, the half metallocene cation complex represented by general formula (III) may be formed in a polymerization reaction system by using the metallocene complex represented by general formula (I) or general formula (II) and the ionic compound represented by general formula [A]$^+$[B]$^-$ for use in the aforementioned reaction in a combined manner in the polymerization reaction system.

Structures of the metallocene complex represented by general formula (I) or general formula (II) and the half metallocene cation complex represented by general formula (III) are each preferably determined through x-ray structural analysis.

The prompter applicable to the first polymerization catalyst composition can be selected according to necessity from components used as prompters in a conventional polymerization catalyst composition containing a metallocene complex. Preferable examples of the prompter include aluminoxane, an organic aluminum compound, the ionic compounds described above, and the like. Either a single type or combination of two or more types of these examples may be used as the prompter.

The aforementioned aluminoxane is preferably alkylaluminoxane and examples thereof include methylaluminoxane (MAO), modified methylaluminoxane, and the like. "MMAO-3A", manufactured by Tosoh Finechem Corporation, or the like is preferable as the modified methyl aluminoxane. Provided that "Al/M" represents an element ratio of the aluminum element Al of the aluminoxane with respect to the core metal M of the metallocene complex represented by general formula (I)/(II) or the half metallocene cation complex represented by general formula (III), the content of the aluminoxane in the first polymerization catalyst composition is set such that the element ratio Al/M is in the range of 10 to 1000 approximately, preferably around 100.

On the other hand, the aforementioned organic aluminum compound is preferably an organic aluminum compound represented by general formula AlRR'R" (in the formula, R and R' each independently represent a $C_{1-10}$ hydrocarbon group or a hydrogen atom and R" represents a $C_{1-10}$ hydrocarbon group). Examples of the organic aluminum compound include trialkylaluminum, dialkylaluminum chloride, alkylaluminum dichloride, dialkylaluminum hydride, and the like. Trialkylaluminum is preferable as the organic aluminum compound among these examples. Examples of trialkylaluminum include triethylaluminum, triisobutylaluminum, and the like. The content of the organic aluminum compound in the first polymerization catalyst composition is preferably 1 to 50 times, more preferably around 10 times, as much as the content of the metallocene complex represented by general formula (I)/(II) or the half metallocene cation complex represented by general formula (III) when compared in mol.

Content of cis-1,4-configuration and/or the molecular weight of a resulting multiblock copolymer can be increased by using each of the metallocene complex represented by general formula (I) or general formula (II) and the half metallocene cation complex represented by general formula (III) with an appropriate prompter in combination in the first polymerization catalyst composition.

<Second Polymerization Catalyst Composition>

Preferable examples of our polymerization catalyst composition further include another type of polymerization catalyst composition (which will be referred to as a "second polymerization catalyst composition" hereinafter). The second polymerization catalyst composition is made up of component (A): a rare earth element compound or a reactant resulted from a reaction between the rare earth element compound and a Lewis base, wherein the rare earth element compound and the reactant thereof have no bond between a relevant rare earth metal and a carbon atom, respectively, and component (B): at least one type of compound selected from the group consisting of (B-1) an ionic compound constituted of a non-coordinating anion and a cation, (B-2) aluminoxane, and (B-3) at least one type of halogen compound selected from a Lewis acid, a complex compound of a metal halide and a Lewis base, and an organic compound containing an active halogen.

In a case where the second polymerization catalyst composition includes at least one of the ionic compound (B-1) and the halogen compound (B-3), the second polymerization catalyst composition further includes component (C) which is an organic metal compound represented by the following formula (i):

(In formula (i), Y represents a metal selected from the group 1, 2, 12 and 13 elements in the periodic table, $R^1$ and $R^2$ each represent a $C_{1-10}$ hydrocarbon group or a hydrogen atom and may be of either the same type or different types, $R^3$ represents a $C_{1-10}$ hydrocarbon group and may be of either the same type as or a different type from $R^1$ and $R^2$, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.)

The ionic compound (B-1) and the halogen compound (B-3) need the component (C) serving as a carbon donor to the component (A) because neither the ionic compound (B-1) nor the halogen compound (B-3) has a carbon atom which can be supplied to the component (A). The second polymerization catalyst composition may include the component (C) in a case where the catalyst composition includes the aluminoxane (B-2). Further, the second polymerization catalyst composition may include other components included in a conventional rare-earth element compound-based polymer catalyst composition, e.g. a prompter. Content of the component (A) contained in the second polymerization catalyst composition is preferably in the range of 0.1 mol/l to 0.0001 mol/l in the polymerization reaction system.

The component (A) for use in the second polymerization catalyst composition is a rare earth element compound or a reactant resulted from a reaction between the rare earth element compound and a Lewis base, wherein the rare earth element compound and the reactant thereof have no bond between a relevant rare earth metal and a carbon atom, respectively. A rare earth element compound or a reactant resulted from a reaction between the rare earth element compound and a Lewis base, having no bond between a relevant rare earth metal and a carbon atom, is stable as a compound and easy to handle. In the present disclosure, a "rare earth element compound" represents a compound containing: one of lanthanoid elements constituted of atomic number 57-71 elements in the periodic table; or scandium or yttrium. Specific examples of the lanthanoid elements include lanthanum, cerium, praseodymium, neodymium, promethium, samarium, europium, gadolinium, terbium, dysprosium, holmium, erbium, thulium, ytterbium, and lutetium.

Either a single type or combination of two or more types of the aforementioned examples may be used as the compound (A).

The rare earth element compound described above is preferably a salt or a complex compound containing a divalent/trivalent rare earth metal and more preferably a rare earth element compound having at least one type of ligand selected from hydrogen atom, halogen atom, and an organic compound residue. Further, the rare earth element compound or the reactant resulted from a reaction between the rare earth element compound and a Lewis base is represented by following general formula (XI) or general formula (XII):

$$M^{11}X^{11}{}_{2}\cdot L^{11}w \qquad (XI)$$

$$M^{11}X^{11}{}_{3}\cdot L^{11}w \qquad (XII)$$

(In these formulae, $M^{11}$ represents a lanthanoid element, scandium or yttrium, $X^{11}$s each independently represent hydrogen atom, halogen atom, alkoxide group, thiolate group, amide group, silyl group, aldehyde residue, ketone residue, carboxylic residue, thiocarboxylic residue or phosphorus compound residue, $L^{11}$ represents a Lewis base, and w represents an integer in the range of 0 to 3.)

Specific examples of a group (ligand) bonded to a rare earth element of the rare earth element compound include: hydrogen atom; aliphatic alkoxy group such as methoxy, ethoxy, propoxy, n-butoxy, isobutoxy, sec-butoxy, tert-butoxy, and the like; phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy; aliphatic thiolate group such as thiomethoxy, thioethoxy, thiopropoxy, thio-n-butoxy, thioisobutoxy, thio-sec-butoxy, thio-tert-butoxy, and the like; aryl thiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like; aliphatic amide group such as dimethylamide, diethylamide, disopropylamide, and the like; arylamide such as phenylamide, 2,6-di-tert-butylphenylamide, 2,6-diisopropylphenylamide, 2,6-dineopentylphenylamide, 2-tert-butyl-6-isopropylphenylamide, 2-tert-buty-6-neopentylphenylamide, 2-isopropyl-6-neopentylphenylamide, 2,4,6-tert-butylphenylamide, and the like; bistrialkylsilylamide such as bistrimethylsilylamide; silyl group such as trimethylsilyl, tris(trimethylsilyl)silyl, bis(trimethylsilyl)methylsilyl, trimethylsilyl(dimethyl)silyl, triisopropylsilyl(bistrimethylsilyl) silyl, and the like; a halogen atom such as fluorine, chlorine, bromine, Iodine atoms; and the like. Specific examples of the ligand further include: aldehyde residue such as salicylaldehyde, 2-hydroxy-1-naphthaldehyde, 2-hydroxy-3-naphthaldehyde, and the like; a residue of hydroxyphenone such as 2'-hydoxyacetophenone, 2'-hydoxybutylophenone, 2'-hydoxypropiophenone, and the like; a residue of diketone such as acetylacetone, benzoylacetone, propionylacetone, isobutylacetone, valeryl acetone, ethyl acetylacetone, and the like; a residue of carboxylic acid such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, versatic acid (a product manufactured by Shell Chemicals, which is a synthetic acid composed of a mixture of isomers of $C_{10}$ monocarboxylic acid), phenylacetic acid, benzoic acid, 2-naphthoic acid, maleic acid, succinic acid, and the like; a residue of thiocarboxylic acid such as hexanethioic acid, 2,2-dimethylbutanethioic acid, decanethioic acid, thiobenzoic acid, and the like; a residue of phosphate ester such as dibutyl phosphate, dipentyl phosphate, dihexyl phosphate, diheptyl phosphate, dioctyl phosphate, bis(2-ethylhexyl) phosphate, bis(1-methylheptyl) phosphate, dilauryl phosphate, dioleoyl phosphate, diphenyl phosphate, bis(p-nonylphenyl) phosphate, bis (polyethylene glycol-p-nonylphenyl) phosphate, (butyl)(2-ethylhexyl) phosphate, (1-methylheptyl)(2-ethylhexyl) phosphate, (2-ethylhexyl)(p-nonylphenyl) phosphate, and the like; a residue of phosphonic ester such as monobutyl (2-ethylhexyl)phosphite, mono-2-ethylhexyl (2-ethylhexyl) phosphite, mono-2-ethylhexyl phenylphosphite, mono-p-nonylphenyl (2-ethylhexyl)phosphite, mono-2-ethylhexyl phosphite, mono-1-methylheptyl phosphite, mono-p-nonylphenyl phosphite, and the like; a residue of phosphinic acid such as dibutyl phosphinic acid, bis(2-ethylhexyl)phosphinic acid, bis(1-methylheptyl)phosphinic acid, dilauryl phosphinic acid, dioleoyl phosphinic acid, diphenyl phosphinic acid, bis(p-nonylphenyl)phosphinic acid, butyl(2-ethylhexyl)phosphinic acid, (2-ethylhexyl)(1-methylheptyl) phosphinic acid, (2-ethylhexyl)(p-nonylphenyl)phosphinic acid, butyl phosphinic acid, 2-ethylhexyl phosphinic acid, 1-methylheptyl phosphinic acid, oleoyl phosphinic acid, lauryl phosphinic acid, phenyl phosphinic acid, p-nonylphenyl phosphinic acid, and the like. Either a single type or combination of two or more types of the aforementioned examples or the like may be used as the ligands.

In the component (A) for use in the second polymerization catalyst composition, examples of the Lewis base to be reacted with the rare earth element compound include tetrahydrofuran, diethyl ether, dimethylaniline, trimethylphosphine, lithium chloride, neutral olefins, neutral diolefins, and the like. In this connection, in a case where the rare earth element compound is reacted with a plurality of Lewis bases (i.e. in a case where w=2 or 3 in formula (XI) and formula (XII)), these Lewis bases $L^{11}$s may be of either the same type or the different types.

The component (B) for use in the second polymerization catalyst composition is at least one type of compound selected from the group consisting of: an ionic compound (B-1); aluminoxane (B-2); and a halogen compound (B-3). The total content of the component (B) in the second polymerization catalyst composition is preferably 0.1 to 50 times as much as the content of the component (A) in the composition when compared in mol.

The ionic compound, referred to as (B-1) in the present disclosure, is constituted of a non-coordinating anion and a cation. Examples of the ionic compound (B-1) include an ionic compound capable of being reacted with the compound (A), i.e. a rare earth element compound or a reactant resulted from a reaction between the rare earth element compound and a Lewis base, to generate a cationic transition metal compound. In this connection, examples of the non-coordinating anion include tetraphenylborate, tetrakis (monofluorophenyl)borate, tetrakis(difluorophenyl)borate, tetrakis(trifluorophenyl)borate, tetrakis(tetrafluorophenyl) borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris (pentafluorophenyl)](phenyl)borate, tridecahydride-7,8-dicarbaundecaborate, and the like. Examples of the cation include carbonium cation, oxonium cation, ammonium cation, phosphonium cation, cycloheptatrienyl cation, ferroceium cation having transition metal, and the like. Specific examples of carbonium cation include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation, tri(dimethylphenyl)carbonium cation, and the like. Specific examples of the ammonium cation include: trialkylammonium cation such as trimethylammonium cation, triethylammonium cation, tripropylammonium cation, tributylammonium cation (e.g. tri(n-butyl)ammonium cation); N,N-dialkylanilinium cation such as N,N-dimethylanilinium cation, N,N-diethylanilinium cation, N,N-2,4,6-pentamethylanilinium cation, and the like; and dialkylammonium cation such as diisopropylammonium cation, dicyclohexylammonium cation, and the like. Specific examples of phosphonium cation include triarylphosphonium cation such as triphenylphosphonium cation, tri(methylphenyl)phosphonium cation, tri(dimethylphenyl)phosphonium cation, and the like. A compound as a combination of a non-coordinating anion and a cation selected from the aforementioned examples, respectively, is preferably used as the ionic compound (B-1). Specific examples of the ionic compound (B-1) include N,N-dimethylanilinium tetrakis(pentafluorophenyl)borate triphenylcarbonium tetrakis(pentafluorophenyl)borate, and the like. Either a single type or combination of two or more types of the aforementioned examples may be used as the ionic compound (B-1). The content of the ionic component (B-1) in the second polymerization catalyst composition is preferably 0.1 to 10 times, more preferably approximately 1 times, as much as the content of the component (A) when compared in mol.

Aluminoxane, referred to as (B-2) in the present disclosure, is a compound obtained by bringing an organic aluminum compound into contact with a condensing agent. Examples of aluminoxane include a chain aluminoxane or a cyclic aluminoxane represented by general formula: (—Al(R')O—) and having repeating units (in the formula, R' represents a $C_{1-10}$ hydrocarbon group; some of the hydrocarbon groups may be substituted with halogen atom and/or alkoxy group; and polymerization degree of the repeating units is preferably ≥5 and more preferably ≥10). Specific examples of R' include methyl, ethyl, propyl, isobutyl groups and the like. Methyl group is preferable as R' among these examples. Examples of the organic aluminum compound used as a raw material of aluminoxane include trialkylaluminum such as trimethylaluminum, tri ethyl aluminum, triisobutyl aluminum, and a mixture thereof. Trimethylaluminum is particularly preferable among these examples as the organic aluminum compound. An aluminoxane obtained by using a mixture of trimethylaluminum and tributylaluminum as the raw material can be suitably used, for example. Provided that "Al/M" represents an element ratio of the aluminum element Al of aluminoxane with respect to the rare earth element M constituting the component (A), the content of aluminoxane (B-2) in the second polymerization catalyst composition is preferably set such that the element ratio Al/M is in the range of 10 to 1000 approximately.

The halogen compound, referred to as (B-3) in the present disclosure, is at least one type of halogen compound selected from a Lewis acid, a complex compound of a metal halide and a Lewis base, and an organic compound containing an active halogen. The halogen compound (B-3) is, for example, capable of being reacted with the component (A), i.e. a rare earth element compound or a reactant resulted from a reaction between the rare earth element compound and a Lewis base, to generate a cationic transition metal compound. The total content of the halogen compound (B-3) in the second polymerization catalyst composition is preferably 1 to 5 times as much as the content of the component (A) when compared in mol.

Examples of the Lewis acid include a boron-containing halogen compound such as $B(C_6F_5)_3$, an aluminum-containing halogen compound such as $Al(C_6F_5)_3$, and a halogen compound containing a group III, IV, V, VI or VIII element in the periodic table. Preferable examples of the Lewis acid include aluminum halide and organic metal halide. Chlorine or bromine is preferable as the halogen element. Specific examples of the Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethyl aluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride, and the like. Diethylaluminum chloride, ethylaluminum sesquichloride, ethylaluminum dichloride, diethylaluminum bromide, ethylaluminum sesquibromide, and ethylaluminum dibromide are particularly preferable as the Lewis acid among these examples.

Examples of the metal halide which, together with a Lewis base, constitutes a complex compound include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide, and the like. Magnesium chloride, calcium chloride, barium chloride, manganese chloride, zinc chloride, copper chloride are preferable as the metal halide among these examples. Magnesium chloride, manganese chloride, zinc chloride, copper chloride are particularly preferable.

Further, preferable examples of the Lewis base constituting, together with the metal halide, a complex compound include a phosphorus compound, a carbonyl compound, a nitrogen compound, an ether compound, alcohol, and the like. Specifically, acceptable examples of the Lewis base include tributyl phosphate, tris (2-ethylhexyl) phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid, triethylamine, N,N-dimethylacetoamide, tetrahydrofuran, diphenyl ether, 2-ethyl-hexyl alcohol, oleyl alcohol, stearyl alcohol, phenol, benzyl alcohol, 1-decanol, lauryl alcohol, and the like. Tris (2-ethylhexyl) phosphate, tricresyl phosphate, acetylacetone, 2-ethyl-hexanoic acid, versatic acid, 2-ethyl-hexyl alcohol, 1-decanol, lauryl alcohol are preferable as the Lewis base among these examples.

0.01 to 30 mol (preferably 0.5 to 10 mol) per 1 mol of the metal halide, of the aforementioned Lewis base, is reacted with the metal halide. Metals remaining in the polymer can be reduced by using a reactant obtained by this reaction between the metal halide and the Lewis base.

Examples of the organic compound containing active halogen, as the compound (B-3), include benzyl chloride and the like.

The component (C) for use in the second polymerization catalyst composition is an organic metal compound represented by the aforementioned formula (i):

$$YR^1{}_a R^2{}_b R^3{}_c \tag{i}$$

(In formula (i), Y represents a metal selected from the group 1, 2, 12 and 13 elements in the periodic table, $R^1$ and $R^2$ each represent a $C_{1-10}$ hydrocarbon group or a hydrogen atom and may be of either the same type or different types, $R^3$ represents a $C_{1-10}$ hydrocarbon group and may be of either the same type as or a different type from $R^1$ and $R^2$, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.)

The component (C) is preferably an organic aluminum compound represented by general formula (X):

$$AlR^{11}R^{12}R^{13} \tag{X}$$

(In formula (X), $R^{11}$ and $R^{12}$ each represent a $C_{1-10}$ hydrocarbon group or a hydrogen atom and may be of either the same type or different types, $R^{13}$ represents a $C_{1-10}$ hydrocarbon group and may be of either the same type as or a different type from $R^{11}$ and $R^{12}$.)

Examples of the organic aluminum compound represented by general formula (X) include trimethylaluminum, tri ethyl aluminum, tri-n-propylaluminum, triisopropylaluminum, tri-n-butylaluminum, triisobutyl aluminum, tri-t-butylaluminum, tripentylaluminum, trihexylaluminum, tricyclohexylaluminum, trioctylaluminum; hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride, and the like. Triethylaluminum, triisobutylaluminum, hydrogenated diethyl aluminum and hydrogenated diisobutylaluminum are preferable as the organic aluminum compound among these examples. Either a single type or combination of two or more types of the aforementioned examples of the organic metal compound may be used as the compound (C). The content of the organic aluminum compound (B-3) in the second polymerization catalyst composition is preferably 1 to 50 times, more preferably approximately 10 times, as much as the content of the component (A) when compared in mol.

<Polymerization Catalyst>

Preferable examples of a polymerization catalyst include a metallocene-based composite catalyst represented by the following formula (A):

$$R_a MX_b QY_b \tag{A}$$

(In formula (A), Rs each independently represent unsubstituted/substituted indenyl; M is coordinated with Rs; M represents a lanthanoid element, scandium or yttrium; Xs each independently represent a $C_{1-20}$ hydrocarbon group; M and Q are μ-coordinated with X; Q represents a group 13 element in the periodic table; Ys each independently represent a $C_{1-20}$ hydrocarbon group or a hydrogen atom; Q is coordinated with Y; and a=b=2). The aforementioned metallocene-based composite catalyst is more preferably a metallocene-based composite catalyst represented by following formula (XX):

(In formula (XX), $M^{21}$ represents a lanthanoid element, scandium or yttrium; $Cp^R$s each independently represent unsubstituted/substituted indenyl; $R^{21}$ and $R^{22}$ each independently represent a $C_{1-20}$ hydrocarbon group; $M^{21}$ and Al are μ-coordinated with $R^{21}$ and $R^{22}$; and $R^{23}$ and $R^{24}$ each independently represent a $C_{1-20}$ hydrocarbon group or a hydrogen atom.)

A "metallocene-based composite catalyst" represents a compound containing a rare earth element (lanthanoid element, scandium or yttrium) and a group 13 element in the periodic table. It is possible to reduce an amount of alkylaluminum for use in synthesis of the multiblock copolymer or even eliminate the alkylaluminum by using the metallocene-based composite catalyst described above, for example, a catalyst which has been combined with aluminum catalyst in advance to be a composite. It should be noted in this connection that a large amount of alkylaluminum is needed during synthesis of the multiblock copolymer if the conventional catalyst system is employed. For example, alkylaluminum must be used by an amount at least 10 times as much as the chemically equivalent amount of a relevant metal catalyst in the conventional catalyst system. In contrast, in the case of using the metallocene-based composite catalyst described above, a good catalytic effect is demonstrated by adding alkylaluminum by an amount around 5 times as much as the chemically equivalent amount of the metal catalyst. The expression that "M and Q are μ-coordinated with X" represents that M and Q are coordinated with X in a crosslinking manner.

With regard to the metallocene-based composite catalyst represented by formula (A) above, the metal M is a lanthanoid element, scandium or yttrium. The lanthanoid elements include the fifteen elements having atomic numbers 57-71 and any of these elements is acceptable. Preferable examples of the core metal M include samarium Sm, neodymium Nd, praseodymium Pr, gadolinium Gd, cerium Ce, holmium Ho, scandium Sc, and yttrium Y.

In formula (A), Rs each independently represent unsubstituted/substituted indenyl and M is coordinated with Rs. Specific examples of the substituted indenyl group include 1,2,3-trimethyl indenyl, heptamethylindenyl, 1,2,4,5,6,7-hexamethylindenyl, and the like.

In formula (A), Q represents a group 13 element in the periodic table and specific examples thereof include boron, aluminum, gallium, indium, thallium, and the like.

In formula (A), Xs each independently represent a $C_{1-20}$ hydrocarbon group and M and Q are μ-coordinated with X. Examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

In formula (A), Ys each independently represent a $C_{1-20}$ hydrocarbon group or a hydrogen atom and Q is coordinated with Y. In this connection, examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

On the other hand, in the metallocene-based composite catalyst represented by formula (XX) above, the metal $M^{21}$ in formula (XX) is a lanthanoid element, scandium or yttrium. The lanthanoid elements include the fifteen elements having atomic numbers 57-71 and any of these elements is acceptable. Preferable examples of the core metal $M^{21}$ include samarium Sm, neodymium Nd, praseodymium Pr, gadolinium Gd, cerium Ce, holmium Ho, scandium Sc, and yttrium Y.

In formula (XX), $Cp^R$s are unsubstituted/substituted indenyls. $Cp^R$ having an indenyl ring as the base skeleton may be represented as $C_9H_{7-X}R_X$ or $C_9H_{11-X}R_X$, wherein X is an integer in the range of 0 to 7 or 0 to 11; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like. Specific examples of the substituted indenyl include 2-phenylindenyl, 2-methyl indenyl, and the like. The two $Cp^R$s in general formula (XX) may be of either the same type or different types.

In formula (XX), $R^{21}$ and $R^{22}$ each independently represent a $C_{1-20}$ hydrocarbon group and $M^{21}$ and Al are μ-coordinated with $R^{21}$ and $R^{22}$. In this connection, examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

In formula (XX), $R^{23}$ and $R^{24}$ each independently represent a $C_{1-20}$ hydrocarbon group or a hydrogen atom. In this connection, examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

The metallocene-based composite catalyst described above can be obtained by reacting a metallocene complex represented by formula (I) described in connection with the first polymerization catalyst composition, with an organic aluminum compound represented by $AlR^{25}R^{26}R^{27}$ in a solvent, wherein $R^{25}$ and $R^{26}$ each independently represent a monovalent $C_{1-20}$ hydrocarbon group or a hydrogen atom; $R^{27}$ represents a monovalent $C_{1-20}$ hydrocarbon group; and $R^{27}$ may be of either the same type as or a different type from $R^{25}$ and $R^{26}$. Examples of the monovalent $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene or hexane can be used. The structure of the metallocene-based composite catalyst described above is preferably determined through $^1$H-NMR or x-ray structural analysis.

Specific examples of the organic aluminum compound include trimethylaluminum, triethylaluminum, tri-n-propylaluminum, triisopropylaluminum, tri-n-butylaluminum, triisobutyl aluminum, tri-4-butylaluminum, tripentylaluminum, trihexylaluminum, tricyclohexylaluminum, trioctylaluminum; hydrogenated diethylaluminum, hydrogenated di-n-propylaluminum, hydrogenated di-n-butylaluminum hydrogenated diisobutylaluminum, hydrogenated dihexylaluminum, hydrogenated diisohexylaluminum, hydrogenated dioctylaluminum, hydrogenated diisooctylaluminum; ethylaluminum dihydride, n-propylaluminum dihydride, isobutylaluminum dihydride, and the like. Triethylaluminum, triisobutylaluminum, hydrogenated diethylaluminum and hydrogenated diisobutylaluminum are preferable as the organic aluminum compound among these examples. Either a single type or combination of two or more types of these examples may be used as the organic aluminum compound. An amount of the organic aluminum compound for use in generation of the metallocene-based composite catalyst is preferably 1 to 50 times, more preferably approximately 10 times, as much as the amount of the metallocene complex when compared in mol.

<Third Polymerization Catalyst Composition>

Preferable examples of our polymerization catalyst composition further include yet another type of polymerization catalyst composition composed of the metallocene-based composite catalyst described above and a boron anion. This polymerization catalyst composition will be referred to as a "third polymerization catalyst composition" hereinafter. The third polymerization catalyst composition may also include other components, e.g. a prompter, contained in a conventional polymerization catalyst composition containing a metallocene complex. A catalyst composed of the metallocene-based composite catalyst and a boron anion is occasionally referred to as a "two-component catalyst". It is possible to manufacture a multiblock copolymer via copolymerization of a conjugated diene compound with a non-conjugated olefin by using the third polymerization catalyst composition, as is the case with using the metallocene-based composite catalyst described above. Further, when the third polymerization catalyst composition is used, it is possible to control contents of the respective monomer components in the multiblock copolymer as desired because the third polymerization catalyst composition contains a boron anion.

Specific examples of the boron anion constituting a two-component catalyst as the third polymerization catalyst composition include a quadrivalent boron anion. Examples of the quadrivalent boron anion include tetraphenyl borate, tetrakis(monofluorophenyl)borate, tetrakis(difluorophenyl) borate, tetrakis(trifluorophenyl)borate, tetrakis(tetrafluorophenyl)borate, tetrakis(pentafluorophenyl)borate, tetrakis (tetrafluoromethylphenyl)borate, tetra(tolyl)borate, tetra (xylyl)borate, triphenyl(pentafluorophenyl)borate, [tris (pentafluorophenyl)](phenyl)borate, tridecahydride-7,8-dicarbaundecaborate, and the like. Tetrakis (pentafluorophenyl)borate is preferable as the quadrivalent boron anion among these examples.

The boron anion can be used as an ionic compound in which the boron anion is combined with a cation. Examples of the cation include carbonium cation, oxonium cation, amine cation, phosphonium cation, cycloheptatrienyl cation, ferroceium cation having transition metal, and the like. Specific examples of carbonium cation include trisubstituted carbonium cation such as triphenylcarbonium cation, tri (substituted phenyl)carbonium cation, and the like. Specific examples of the tri(substituted phenyl)carbonium cation include tri(methylphenyl)carbonium cation, and the like.

Specific examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation, and the like; and dialkylammonium cation such as diisopropylammonium cation, dicyclohexylammonium cation, and the like. Specific examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation and carbonium cation are preferable and N,N-dialkylanilinium cation is particularly preferable as the cation among these examples. Accordingly, N,N-dimethylanilinium tetrakis(pentafluorophenyl)borate, triphenylcarbonium tetrakis(pentafluorophenyl)borate, and the like are preferable as the ionic compound. The ionic compound composed of the boron anion and the cation is preferably added by an amount 0.1 to 10 times, more preferably approximately 1 times, as much as the amount of the metallocene-based composite catalyst when compared in mol.

It is necessary to use the metallocene-based composite catalyst and the boron anion in the third polymerization catalyst composition. However, the metallocene-based composite catalyst represented by formula (A) cannot be synthesized when a boron anion exists in a reaction system for reacting a metallocene complex represented by formula (I) with an organic aluminum compound. Accordingly, preparation of the third polymerization catalyst composition requires synthesizing the metallocene-based composite catalyst in advance, isolating and purifying the metallocene-based composite catalyst thus synthesized, and then combining the metallocene-based composite catalyst with a boron anion.

Preferable examples of the prompter which may be used for the third polymerization catalyst composition include aluminoxane and the like, as well as the aforementioned organic aluminum compound represented by $AlR^{25}R^{26}R^{27}$. Aluminoxane is defined in the same manner as described in connection with the first polymerization catalyst composition and the second polymerization catalyst composition.

In a first method for manufacturing our multiblock copolymer, polymerization may be carried out in the same manner as the conventional method for manufacturing polymer by using a coordinated ionic polymerization catalyst, except that any of the first, second, and third polymerization catalyst compositions or the polymerization catalyst described above is used in the former. When any of the aforementioned first, second, and third polymerization catalyst compositions is to be used, for example, (i) the respective components to constitute the polymer catalyst composition may be separately provided in a polymerization reaction system containing conjugated diene compound monomers and non-conjugated olefin monomers, so that the polymer catalyst composition is formed in the reaction system, or (ii) the polymer catalyst composition, which has been prepared in advance, may be provided in a polymerization reaction system. In the case of (ii) above, a metallocene complex or a half metallocene cation complex (an active species) activated by a prompter may be provided. Amounts of the metallocene complex, a half metallocene cation complex or a metallocene-based composite complex contained in the polymerization catalyst composition or the polymerization catalyst, for use, is preferably 0.0001 to 0.01 times as much as the total amount of the conjugated diene compound and the non-conjugated olefin in mol.

The copolymerization reaction can be stopped by using a polymerization terminator such as ethanol, isopropanol or the like in the first method for manufacturing our multiblock copolymer.

A copolymerization reaction of the conjugated diene compound and the non-conjugated olefin is preferably carried out in an atmosphere of inert gas, preferably in an atmosphere of nitrogen or argon in the first method for manufacturing our multiblock copolymer. The polymerization temperature in the copolymerization reaction, although it is not particularly restricted, is preferably in the range of −100° C. to 200° C. and may be around the room temperature, for example. Pressure during the copolymerization reaction is preferably in the range of 0.1 MPa to 10.0 MPa in terms of capturing sufficient amounts of the conjugated diene compound and the non-conjugated olefin into the polymerization reaction system. Reaction time of the copolymerization reaction, although it is not particularly restricted, is preferably in the range of 1 second to 10 days and may be appropriately selected depending on the conditions such as types of monomers to be copolymerized, type of the catalyst, the polymerization temperature, and the like.

Regarding copolymerization of a conjugated diene compound and a non-conjugated olefin in the first method for manufacturing our multiblock copolymer, concentration (mol/L) of the conjugated diene compound and concentration (mol/L) of the non-conjugated olefin when polymerization is started preferably satisfy the formula:

concentration of non-conjugated olefin/concentration of conjugated diene compound≥1.0, more preferably satisfy the formula:

concentration of non-conjugated olefin/concentration of conjugated diene compound≥1.3, and further more preferably satisfy the formula:

concentration of non-conjugated olefin/concentration of conjugated diene compound≥1.7.

A non-conjugated olefin can be efficiently introduced to a reaction mixture by setting the value of "concentration of non-conjugated olefin/concentration of conjugated diene compound" to be ≥1.

[Second Method for Manufacturing Multiblock Copolymer]

It is possible to manufacture our multiblock copolymer without using any of the first, second, and third polymerization catalyst compositions or the polymerization catalyst described above but rather using a conventional coordinated ionic polymerization catalyst, by adjusting the manner of charging monomers into a polymerization reaction system. Specifically, a second method for manufacturing our multiblock copolymer controls a chain structure of a multiblock copolymer by controlling the manner of charging a conjugated diene compound under the presence of a non-conjugated olefin, thereby successfully controlling arrangement of monomer units in the multiblock copolymer. A "polymerization reaction system" represents a site where a conjugated diene compound and a non-conjugated olefin are copolymerized and specific examples thereof include a reaction vessel and the like in the present disclosure.

A conjugated diene compound may be charged into a polymerization reaction system either continuously or non-continuously. Alternatively, continuous charging and non-continuous charging may be combined. "Continuous charging" represents adding a substance into a system at a constant feeding rate for a certain period.

It is possible to control a concentration ratio of monomers in a polymerization reaction system for copolymerizing a conjugated diene compound and a non-conjugated olefin, by non-continuously or continuously charging the conjugated diene compound into the polymerization reaction system, thereby imparting a chain structure (i.e. an arrangement of monomer units) in a resulting multiblock copolymer with a specific feature. Further, formation of homopolymers of the conjugated diene compound can be suppressed because the non-conjugated olefin exists in the polymerization reaction system when the conjugated diene compound is charged in this case. The conjugated diene compound may be charged after polymerization of the non-conjugated olefin is started, in this regard.

In a case where our multiblock copolymer is manufactured by the second manufacturing method, it is effective to continuously charge a conjugated diene compound into a polymerization reaction system where polymerization of a non-conjugated olefin has already started, i.e. under the presence of the non-conjugated olefin in such a state. In this regard, it is particularly effective to repeat, twice or more, an operation of polymerizing a non-conjugated olefin in a polymerization reaction system and then continuously charging a conjugated diene compound into the polymerization reaction system under the presence of the non-conjugated olefin in such a state.

The second manufacturing method is not particularly restricted, except that the manner of charging monomers into a polymerization reaction system is specified as described above, and may be carried out by using any polymerization method such as solution polymerization, suspension polymerization, liquid-phase bulk polymerization, emulsion polymerization, vapor-phase polymerization, or solid-phase polymerization. Further, the second manufacturing method can implement copolymerization of conjugated diene compound monomers and non-conjugated olefin monomers in the same manner as the first manufacturing method, except that the manner of charging monomers into a polymerization reaction system is specified as described above in the former.

The second manufacturing method necessitates controlling the manner of charging a conjugated diene compound into a polymerization reaction system. Specifically, it is preferable to control an amount and/or the number of charging a conjugated diene compound in this regard. Examples of a method for controlling the manner of charging a conjugated diene compound include automatic control by a computer program or the like and manual control by using a timer or the like, without being limited thereto. Further, a conjugated diene compound may be charged either continuously or non-continuously as described, without particular limitation in this regard. In a case where a conjugated diene compound is charged non-continuously, the number of charging the conjugated diene compound is not particularly restricted as long as our multiblock copolymer can be manufactured.

It is preferable that a non-conjugated olefin is continuously supplied to a polymerization reaction system in the second manufacturing method because the non-conjugated olefin must exist in the polymerization reaction system when a conjugated dine compound is charged. A method for supplying the non-conjugated olefin is not particularly restricted, otherwise.

A multiblock copolymer thus obtained by the first or second manufacturing method is subjected to, after the copolymerization reaction is stopped as required, separation from the polymerization reaction system by using, e.g. a large amount of solvent, then vacuum dry and the like for applications as desired.

[Rubber Composition]

Components of our rubber composition are not particularly restricted as long as the rubber composition contains the aforementioned multiblock copolymer as a rubber component and may be appropriately selected according to the purpose. The rubber composition may contain various types of additives generally used for a rubber composition, such as inorganic filler, carbon black, crosslinking agent, and the like. The proportion of the multiblock copolymer in the rubber components is not particularly limited but the higher proportion of the multiblock copolymer results in the better fracture resistance and weather resistance.

Types of rubber components other than the aforementioned multiblock copolymer are not particularly restricted and one or more types of rubber components can be appropriately selected according to the purpose and included in the rubber composition. Examples of other rubber components include natural rubber, various types of butadiene rubbers, various types of styrene-butadiene copolymer rubber, isoprene rubber, a bromide of isobutylene and p-methylstyrene, chloroprene rubber, ethylene-propylene copolymer rubber, ethyl ene-propylene-diene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrin rubber, polysulfide rubber, silicone rubber, flurorubber, urethane rubber, and the like.

The rubber composition may contain as a reinforcing filler at least one type of filler selected from black filler such as carbon black and white filler such as silica and an inorganic compound. Content of the reinforcing filler is not particularly restricted and may change, depending on types and compositions of the reinforcing filler and the rubber components for use in the rubber composition, and applications of the rubber composition, but is preferably 10 to 200 parts by mass and more preferably 30 to 100 parts by mass with respect to 100 parts by mass of the rubber components. The content of the reinforcing filler ≥10 parts by mass ensures obtaining a required reinforcing effect in a satisfactory manner. The content of the reinforcing filler ≤200 parts by mass ensures good mixture of the filler and the rubber components.

Types of carbon black which can be used as black filler are not particularly limited and examples thereof include carbon blacks of SAF, ISAF, HAF (N330), FF, FEF, GPF, SRF, CF, FT and MT grades. Either a single type or combination of two or more types of these examples may be used as carbon black. These examples of carbon black may be used in combination with white filler.

Types of white filler are not particularly limited and may be selected according to the purpose. Examples of the white filler include silica and an inorganic compound represented by general formula:

$$mM \cdot xSiO_y \cdot zH_2O \qquad (V)$$

[In the formula, M represents at least one type of substance selected from: metal selected from the group consisting of aluminum, magnesium, titanium, calcium and zirconium; oxide or hydroxide of the metal; hydrates of the oxide/hydroxide; and a carbonate salt of the metal, m, x, y and z represent an integer in the range of 1 to 5, an integer in the range of 0 to 10, an integer in the range of 2 to 5, and an integer in the range of 0 to 10, respectively.] Type of silica is not particularly restricted and examples thereof for use include wet silica, dry silica, colloidal silica, and the like. Type of the inorganic compound represented by formula (V) is not particularly restricted and examples thereof include: alumina ($Al_2O_3$) such as γ-alumina, α-alumina; alumina monohydrate ($Al_2O_3.H_2O$) such as Boehmite, diaspore; aluminum hydroxide [$Al(OH)_3$] such as gibbsite, bayerite; aluminum carbonate [$Al_2(CO_3)_3$]; magnesium hydroxide [$Mg(OH)_2$]; magnesium oxide (MgO); magnesium carbonate $MgCO_3$); (talc ($3MgO.4SiO_2.H_2O$); attapulgite ($5MgO.8SiO_2.9H_2O$); titanium white ($TiO_2$); titanium black ($TiO_{2n-1}$); calcium oxide (CaO); calcium hydroxide [$Ca(OH)_2$]; magnesium aluminum oxide ($MgO.Al_2O_3$); clay ($Al_2O_3.2SiO_2$); kaolin ($Al_2O_3.2SiO_2.2H_2O$); pyrophillite ($Al_2O_3.4SiO_2.H_2O$); bentonite ($Al_2O_3.4SiO_2.2H_2O$); aluminum silicate ($Al_2SiO_5.Al_4.3SiO_4.5H_2O$, etc.); magnesium silicate ($Mg_2SiO_4.MgSiO_3$, etc.); calcium silicate ($Ca_2SiO_4$, etc.); calcium-aluminum silicate ($Al_2O_3.CaO.2SiO_2$, etc.); calcium magnesium silicate ($CaMgSiO_4$); calcium carbonate ($CaCO_3$); zirconium oxide ($ZrO_2$); zirconium hydroxide [$ZrO(OH)_2.nH_2O$]; zirconium carbonate [$Zr(CO_3)_2$]; a crystalline alumino-silicate containing hydrogen, alkaline metal or alkaline earth metal capable of correcting charge, such as various types of zeolite; and the like. Either a single type or combination of two or more types of these examples may be used as the white filler.

The rubber composition may further include, other than the rubber components and the reinforcing filler, additives conventionally used in the rubber industry such as a vulcanizing agent, a vulcanization auxiliary, a vulcanization accelerator, a softener, an antioxidant, a scorch protection agent, a processing aid, a filler-modifying agent, a tackfier, a foaming agent, a coloring agent, and the like. The order and stage in/at which these additives are added is not particularly limited but a vulcanizing agent is added preferably in the final process. Commercially available products can be used as these additives.

Our rubber composition described above can be obtained by mixing and kneading a rubber component containing our multiblock copolymer with a reinforcing filler and other necessary additives. Mixing and kneading can be carried out according to a method conventionally implemented to obtain a rubber composition. For example, our rubber composition can be manufactured by: subjecting the rubber component to mastication as required, by using a conventional rubber mixing-kneading device such as a bunbury mixer, a Brabender plastograph, rolls, a kneader, or the like; adding a reinforcing filler and necessary additives other than a vulcanizing agent, zinc oxide and a vulcanization retarder to the rubber component and mixing and kneading the resulting mixture; adding a vulcanizing agent, zinc oxide and a vulcanization retarder and mixing and kneading the resulting mixture; and subjecting the mixture to warming, extrusion and the like according to necessity, although the manufacturing method is not particularly limited thereto.

[Tire]

Type of our tire is not particularly restricted as long as the tire uses our rubber composition described above and may be appropriately selected according to the purpose. Our tire can be manufactured by a conventional method. For example, our tire can be manufactured as desired by: sequentially stacking structural members generally for use in manufacturing a tire such as a carcass layer, a belt layer and a tread layer, made of the unvulcanized rubber composition, on a tire building drum; pulling the drum out to obtain a green tire; and subjecting the green tire to heating and vulcanization according to the conventional method. Conditions of heating and vulcanization are not particularly restricted and may be appropriately selected according to the purpose but preferably the temperature is kept in the range of 130° C. to 200° C. and the heating time is set in the range of 1 minute to 60 minutes.

EXAMPLES

Hereinafter, the present disclosure will be described more in detail by Examples and Comparative Examples. These Examples and Comparative Examples, however, do not restrict by any means the present disclosure.

[Synthesis of Multiblock Copolymer]

Multiblock copolymers for use in Examples and Comparative Examples were synthesized as described in the following Synthesis Examples.

Synthesis Example 1: Multiblock Copolymer A 200 mL of toluene as a solvent was charged in advance into a dry 1000 mL pressure-resistant stainless reactor.

46 μmol of bis(2-phenylindenyl)gadolinium bis(dimethylsilyl)amide [$(2-PhC_9H_6)_2GdN(SiBMe_2)_2$], 51.0 μmol of N,N-dimethylanilinium tetrakis(pentafluorophenyl)borate [$Me_2NHPhB(C_6F_5)_4$], and 0.7 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C.

Next, ethylene was charged into the pressure-resistant stainless reactor at 1.5 MPa and at the same time a toluene solution containing 1,3-butadiene was continuously charged into the pressure-resistant stainless reactor for 170 minutes at a flow rate of 2 g/minute (in terms of 1,3-butadiene), so that polymerization proceeded at 70° C. Then, after leaving the mixture for 10 minutes, the polymerization reaction was stopped by adding 1 mL isopropanol solution of 5 mass % 2,2-methyl ene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer A was obtained. The yield of Copolymer A thus obtained was 92 g.

Synthesis Example 2: Multiblock Copolymer B 200 mL of toluene as a solvent was charged in advance into a dry 1000 mL pressure-resistant stainless reactor.

46 μmol of bis(2-phenylindenyl)gadolinium bis(dimethylsilyl)amide [$(2-PhC_9H_6)_2GdN(SiHMe_2)_2$], 51.0 μmol of N,N-dimethylanilinium tetrakis(pentafluorophenyl)borate [$Me_2NHPhB(C_6F_5)_4$], and 0.8 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 170 minutes at a flow rate of 2 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer B was obtained. The yield of Copolymer B thus obtained was 94 g.

Synthesis Example 3: Multiblock Copolymer C 200 mL of toluene as a solvent was charged in advance into a dry 1000 mL pressure-resistant stainless reactor.

36 μmol of bis(2-phenylindenyl)gadolinium bis(dimethylsilyl)amide [(2-PhC$_9$H$_6$)$_2$GdN(SiHMe$_2$)$_2$], 39.0 μmol of N,N-dimethylanilinium tetrakis(pentafluorophenyl)borate [Me$_2$NHPhB(C$_6$F$_5$)$_4$], and 0.7 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.6 MPa and at the same time a toluene solution containing 1,3-butadiene was continuously charged into the pressure-resistant stainless reactor for 170 minutes at a flow rate of 2 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer C was obtained. The yield of Copolymer C thus Obtained was 83 g.

Synthesis Example 4: Multiblock Copolymer D 200 mL of toluene as a solvent was charged in advance into a dry 1000 mL pressure-resistant stainless reactor.

36 μmol of bis(2-phenylindenyl)gadolinium bis(dimethylsilyl)amide [(2-PhC$_9$H$_6$)$_2$GdN(SiHMe$_2$)$_2$], 39.0 μmol of N,N-dimethylanilinium tetrakis(pentafluorophenyl)borate [Me$_2$NHPhB(C$_6$F$_5$)$_4$], and 0.65 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.6 MPa and at the same time a toluene solution containing 1,3-butadiene was continuously charged into the pressure-resistant stainless reactor for 170 minutes at a flow rate of 2.0 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer D was obtained. The yield of Copolymer D thus obtained was 81 g.

Synthesis Example 5: Multiblock Copolymer E 200 mL of toluene as a solvent was charged in advance into a dry 1000 mL pressure-resistant stainless reactor.

36 μmol of bis(2-phenylindenyl)gadolinium bis(dimethylsilyl)amide [(2-PhC$_9$H$_6$)$_2$GdN(SiHMe$_2$)$_2$], 39.0 μmol of N,N-dimethylanilinium tetrakis(pentafluorophenyl)borate [Me$_2$NHPhB(C$_6$F$_5$)$_4$], and 0.65 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 148 minutes at a flow rate of 2.3 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer E was obtained. The yield of Copolymer E thus obtained was 81 g.

Synthesis Example 6: Multiblock Copolymer F 200 mL of toluene as a solvent was charged in advance into a dry 1000 mL pressure-resistant stainless reactor.

36 μmol of bis(2-phenylindenyl)gadolinium bis(dimethylsilyl)amide [(2-PhC$_9$H$_6$)$_2$GdN(SiHMe$_2$)$_2$], 39.0 μmol of N,N-dimethylanilinium tetrakis(pentafluorophenyl)borate [Me$_2$NHPhB(C$_6$F$_5$)$_4$], and 0.65 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 164 minutes at a flow rate of 2.3 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer F was obtained. The yield of Copolymer F thus obtained was 89 g.

Synthesis Example 7: Random Copolymer G 200 mL of toluene as a solvent was charged in advance into a dry 1000 mL pressure-resistant stainless reactor.

46 µmol of bis(2-phenylindenyl)gadolinium bis(dimethylsilyl)amide [(2-PhC$_9$H$_6$)$_2$GdN(SiHMe$_2$)$_2$], 51.0 µmol of N,N-dimethylanilinium tetrakis(pentafluorophenyl)borate [Me$_2$NHPhB(C$_6$F$_5$)$_4$], and 0.7 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 79 minutes at a flow rate of 4.3 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer G was obtained. The yield of Copolymer G thus obtained was 71 g.

Synthesis Example 8: Multiblock Copolymer H 300 mL of toluene as a solvent was charged in advance into a dry 1000 mL pressure-resistant stainless reactor.

46 µmol of bis(2-phenylindenyl)gadolinium bis(dimethylsilyl)amide [(2-PhC$_9$H$_6$)$_2$GdN(SiHMe$_2$)$_2$], 51.0 µmol of N,N-dimethylanilinium tetrakis(pentafluorophenyl)borate [Me$_2$NHPhB(C$_6$F$_5$)$_4$], and 1.10 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 240 minutes at a flow rate of 2.4 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer H was obtained. The yield of Copolymer H thus obtained was 160 g.

Synthesis Example 9: Multiblock Copolymer I 300 mL of toluene as a solvent was charged in advance into a dry 1000 mL pressure-resistant stainless reactor.

46 µmol of bis(2-phenylindenyl)gadolinium bis(dimethylsilyl)amide [(2-PhC$_9$H$_6$)$_2$GdN(SiHMe$_2$)$_2$], 51.0 µmol of N,N-dimethylanilinium tetrakis(pentafluorophenyl)borate [Me$_2$NHPhB(C$_6$F$_5$)$_4$], and 1.10 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 138 minutes at a flow rate of 4.2 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer I was obtained. The yield of Copolymer I thus obtained was 133 g.

Synthesis Example 10: Multiblock Copolymer J 250 mL of toluene as a solvent was charged in advance into a dry 1000 mL pressure-resistant stainless reactor.

46 µmol of bis(2-phenylindenyl)gadolinium bis(dimethylsilyl)amide [(2-PhC$_9$H$_6$)$_2$GdN(SiHMe$_2$)$_2$], 51.0 µmol of N,N-dimethylanilinium tetrakis(pentafluorophenyl)borate [Me$_2$NHPhB(C$_6$F$_5$)$_4$], and 0.8 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 152 minutes at a flow rate of 2.0 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer J was obtained. The yield of Copolymer J thus obtained was 76 g.

Synthesis Example 11: Multiblock Copolymer K 250 mL of toluene as a solvent was charged in advance into a dry 1000 mL pressure-resistant stainless reactor.

46 µmol of bis(2-phenylindenyl)gadolinium bis(dimethylsilyl)amide [(2-PhC$_9$H$_6$)$_2$GdN(SiHMe$_2$)$_2$], 51.0 mol of N,N-dimethylanilinium tetrakis(pentafluorophenyl)borate [Me$_2$NHPhB(C$_6$F$_5$)$_4$], and 0.8 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.5 MPa and at the same time a toluene solution containing 1,3-butadiene was continuously charged into the pressure-resistant stainless reactor for 242 minutes at a flow rate of 1.4 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer K was obtained. The yield of Copolymer K thus obtained was 81 g.

Synthesis Example 12: Multiblock Copolymer L 250 mL of toluene as a solvent was charged in advance into a dry 1000 mL pressure-resistant stainless reactor.

46 µmol of bis(2-phenylindenyl)gadolinium bis(dimethylsilyl)amide [(2-PhC$_9$H$_6$)$_2$GdN(SiHMe$_2$)$_2$], 51.0 µmol of N,N-dimethylanilinium tetrakis(pentafluorophenyl)borate [Me$_2$NHPhB(C$_6$F$_5$)$_4$], and 0.8 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.7 MPa and at the same time a toluene solution containing 1,3-butadiene was continuously charged into the pressure-resistant stainless reactor for 137 minutes at a flow rate of 1.4 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer L was obtained. The yield of Copolymer L thus obtained was 88 g.

Synthesis Example 13: Multiblock Copolymer M 250 ml, of toluene as a solvent was charged in advance into a dry 1000 mL pressure-resistant stainless reactor.

46 µmol of bis(2-phenylindenyl)gadolinium bis(dimethylsilyl)amide [(2-PhC$_9$H$_6$)$_2$GdN(SiHMe$_2$)$_2$], 51.0 µmol of N,N-dimethylanilinium tetrakis(pentafluorophenyl)borate [Me$_2$NHPhB(C$_6$F$_5$)$_4$], and 0.7 ml of diisobutylaluminum hydride were charged into a glass vessel in a glovebox under nitrogen atmosphere and these substances were dissolved in 20 mL of toluene, to obtain a catalyst solution. The catalyst solution was collected from the glovebox and stirred for 15 minutes by using a ultrasonic device. The catalyst solution thus stirred was then added to the pressure-resistant stainless reactor and heated up to 50° C. Next, ethylene was charged into the pressure-resistant stainless reactor at 1.7 MPa and at the same time a toluene solution containing 1,3-butadiene was continuously charged into the pressure-resistant stainless reactor for 185 minutes at a flow rate of 1.4 g/minute (in terms of 1,3-butadiene), so that polymerization proceeded at 70° C.

Then, after leaving the mixture for 10 minutes, the polymerization reaction was stopped by adding 1 mL isopropanol solution of 5 mass % 2,2-methylene-bis(4-ethyl-6-t-butylphenol) (NS-5) to the pressure-resistant stainless reactor. Thereafter, a large amount of methanol was added to isolate copolymer and the copolymer thus isolated was vacuum-dried at 50° C., whereby Copolymer M was obtained. The yield of Copolymer M thus obtained was 79 g.

[Physical Properties of Polymers]

Content of a non-conjugated olefin portion, storage modulus G' at 130° C., storage modulus G' at 100° C. the weight average molecular weight in terms of polystyrene, and the melting point were determined for each of the multiblock copolymers synthesized in the Synthesis Examples and butadiene rubber and polyethylene/butadiene rubber mixture for use in Comparative Examples. Difference between the values of storage modulus G' at 130° C. and storage modulus G' at 100° C. was calculated for each of Examples and Comparative Examples. The methods for determining/calculating the aforementioned physical properties were as follows.

<Content of Non-Conjugated Olefin Portion>

Content (mass %) of a non-conjugated olefin portion of each sample was determined by: measuring $^{13}$C-NMR spectrum of the sample; and obtaining an integration ratio of a peak derived from a non-conjugated olefin block and a peak derived from a conjugated diene compound block, to calculate content of the non-conjugated olefin portion based on the integration ratio.

<Storage Modulus G' at 130° C.>

Storage modulus G' at 130° C. was determined for each of the multiblock copolymers for use in Examples and Comparative Examples and butadiene rubber and polyethylene/butadiene rubber mixture for use in Comparative Examples by preparing a vulcanization test piece for each sample according to ASTM D6204 and measuring storage modulus G' at 130° C. under the conditions of frequency: 1 Hz, strain: 100%, and temperature: 130° C. by using a rubber process analyzer "RPA 2000" manufactured by Alpha-Technologies Ltd.

<Storage Modulus G' at 100° C.>

Storage modulus G' at 100° C. was determined for each sample in the same manner as in determination of storage modulus G' at 130° C., except that the measurement temperature was set at 100° C. in the former.

<Difference Between G' at 130° C. and G' at 100° C.>

The absolute value of a value obtained by subtracting the storage modulus G' value at 100° C. thus determined from the storage modulus G' value at 130° C. thus determined was regarded as "Difference between G' at 130° C. and G' at 100° C.".

<Weight Average Molecular Weight in Terms of Polystyrene>

The weight average molecular weight in terms of polystyrene was determined according to gel permeation chromatography (GPC) by using polystyrene as the standard substance.

<Melting Point Measured by Differential Scanning Calorimetry (DSC)>

The melting point was measured for each sample by differential scanning calorimetry (DSC) according to JIS K7121: 1987. It was confirmed that the copolymers thus synthesized were unanimously multiblock copolymers each having melting point equal to or lower than 120° C.

Further, it was confirmed from the results of $^1$H-NMR spectra that the copolymers thus synthesized were unanimously multiblock copolymers.

[Evaluation Method]

Rubber compositions of Examples and Comparative Examples, respectively prepared according to the blending ratios shown in Table 1, were each vulcanized and ozone resistance and fracture resistance of a vulcanized rubber sample thus obtained was evaluated for each rubber composition. Evaluation methods are as follows. The evaluation results are shown, together with the relevant physical properties, in Table 2 and Table 3.

<Ozone Resistance>

Ozone resistance was determined according to JIS K6259 by: preparing a strip-shaped test piece for each vulcanized rubber sample; exposing the test piece to the conditions of temperature: 40° C. and ozone concentration: 50 pphm, while imparting the test piece with dynamic stretching (20%); and visually evaluating the state of the test piece after 24 hours in terms of presence/absence of cracks and, if any, dimensions of cracks. No generation of cracks indicates that the sample has satisfactory ozone resistance, i.e. satisfactory weather resistance.

<Fracture Resistance>

Fracture resistance was determined by: subjecting each vulcanized rubber sample to a tensile test according to JIS K6251, to measure tensile strength at fracture (rupture) and elongation at fracture (rupture) at the room temperature; calculating a fracture resistance value by the following equation, based on the tensile strength and elongation at fracture (rupture) thus measured; and expressing the fracture resistance value by an index value relative to the fracture resistance value of Comparative Example 1 being "100". The larger index value represents the higher fracture resistance.

(Fracture resistance value)=(Tensile strength at fracture)×(Elongation at fracture)/2

TABLE 1

| Mixing and kneading | Formulations Parts by mass | Examples | | | | | | | | | Comparative Examples | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| First stage | BR(butadiene rubber) | | | | | | | | | | 100 | | 85 | | | |
| | Copoymer A | 100 | | | | | | | | | | | | | | |
| | Copoymer B | | 100 | | | | | | | | | | | | | |
| | Copoymer C | | | 100 | | | | | | | | | | | | |
| | Copoymer D | | | | 100 | | | | | | | | | | | |
| | Copoymer E | | | | | 100 | | | | | | | | | | |
| | Copoymer F | | | | | | 100 | | | | | | | | | |
| | Copoymer G | | | | | | | 100 | | | | | | | | |
| | Copoymer H | | | | | | | | 100 | | | | | | | |
| | Copoymer I | | | | | | | | | 100 | | | | | | |
| | Copoymer J | | | | | | | | | | | 100 | | | | |
| | Copoymer K | | | | | | | | | | | | 100 | | | |
| | Copoymer L | | | | | | | | | | | | | | 100 | |
| | Copoymer M | | | | | | | | | | | | | | | 100 |
| | PE(polyethylene) | | | | | | | | | | | | | 15 | | |
| | Carbon black*1 | 50 | 50 | 50 | 50 | 50 | 50 | 50 | 50 | 50 | 50 | 50 | 50 | 50 | 50 | 50 |
| | Stearic acid | 2 | 2 | 2 | 2 | 2 | 2 | 2 | 2 | 2 | 2 | 2 | 2 | 2 | 2 | 2 |
| | 6C*2 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Resin*3 | 2 | 2 | 2 | 2 | 2 | 2 | 2 | 2 | 2 | 2 | 2 | 2 | 2 | 2 | 2 |
| Second stage | Zinc white | 3 | 3 | 3 | 3 | 3 | 3 | 3 | 3 | 3 | 3 | 3 | 3 | 3 | 3 | 3 |
| | Vulcanization accelerator DM*4 | 1 | 1 | 1 | 1 | 1 | 1 | 1 | 1 | 1 | 1 | 1 | 1 | 1 | 1 | 1 |
| | Vulcanization accelerator NS*5 | 1 | 1 | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 | 2 | 2 |

*1"Seast F", manufactured by Tokai Carbon Co., Ltd.
*2N-phenyl-N'-(1,3-dimethylbutyl)-p-phenylenediamine, i.e."Nocrac 6C", manufactured by Ouchi Shinko Chemical Industrial Co., Ltd.
*3Mixture of C5 and C9 petroleum resins, manufactured by Seiko Chemical Co., Ltd.
*4Di-2-benzothiazolyl disulfide, i.e. "Nocceler-DM-P", manufactured by Ouchi Shinko Chemical Industrial Co., Ltd.
*5N-tert-butyl-2-benzothiazolylsulfenamide, "Nocceler-NS-P", manufactured by Ouchi Shinko Chemical Industrial Co., Ltd.

TABLE 2

| | Examples | | | | | | | | |
|---|---|---|---|---|---|---|---|---|---|
| | 1 | 2 | 3 | 4 | 5 | 6 | 7 | 8 | 9 |
| Rubber Component*1 | Copoymer A | Copoymer B | Copoymer C | Copoymer D | Copoymer E | Copoymer F | Copoymer G | Copoymer H | Copoymer I |
| Content of non-conjugated olefin portion [mass %] | 25 | 25 | 17.8 | 16.6 | 14.6 | 10 | 4.7 | 24.5 | 12 |
| Storage modulus G' at 130° C. [kPa] | 25 | 21 | 23 | 31 | 45 | 40 | 46 | 20 | 55 |
| Storage modulus G' at 100° C. [kPa] | 63 | 50 | 63 | 126 | 134 | 69 | 64 | 63 | 127 |
| Difference in G' between 130° C. and 100° C. [kPa] | 38 | 29 | 40 | 95 | 89 | 29 | 18 | 43 | 72 |
| Weight average molecular weight in terms of polystyrene [×10$^3$] | 355 | 350 | 330 | 440 | 430 | 456 | 562 | 441 | 700 |

TABLE 2-continued

| | | | | | | | | | |
|---|---|---|---|---|---|---|---|---|---|
| Melting point measured by DSC [° C.] | 99 | 94 | 106 | 109 | 112 | 96 | 112 | 92 | 104 |
| Evaluation Ozone resistance (Presence/absence of cracks after 24 hours) | None | None | None | None | None | None | None | None | None |
| Fracture resistance (Index) | 145 | 130 | 115 | 120 | 116 | 125 | 105 | 140 | 115 |

*[1]A~I: Multiblock copolymers

| | Comparative Examples | | | | | |
|---|---|---|---|---|---|---|
| | 1 | 2 | 3 | 4 | 5 | 6 |
| Rubber Component*[1] | BR | Copoymer J | Copoymer K | PE/BR | Copoymer L | Copoymer M |
| Content of non-conjugated olefin portion [mass %] | 0 | 20.6 | 25 | 15*[2] | 51 | 26.7 |
| Storage modulus G' at 130° C. [kPa] | 80 | 17 | 17 | 1 | 2 | 24 |
| Storage modulus G' at 100° C. [kPa] | 102 | 49 | 105 | 7 | 211 | 143 |
| Difference in G' between 130° C. and 100° C. [kPa] | 22 | 32 | 88 | 6 | 209 | 119 |
| Weight average molecular weight in terms of polystyrene [×10³] | 450 | 332 | 320 | 10/480 | 185 | 345 |
| Melting point measured by DSC [° C.] | — | 95 | 106 | — | 111 | 118 |
| Evaluation Ozone resistance (Presence/absence of cracks after 24 hous) | Large crack | None | None | Fine crack | None | None |
| Fracture resistance (Index) | 100 | 69 | 74 | 40 | 50 | 86 |

*[1]BR: Butadiene rubber, PE/BR: Polyethylene/Butadiene rubber mixture. J~M: Multiblock copolymers
*[2]The value represents the content of non-conjugated olefin polymer (PE) in the whole mixture.

It is understood from the results shown in Tables 2-1 and 2-2 that vulcanized rubber having high fracture resistance and high weather resistance can be obtained from our rubber composition of Examples, each containing our multiblock copolymer as a rubber component. For the same reason, a tire using our rubber composition exhibits high fracture resistance and high weather.

INDUSTRIAL APPLICABILITY

Our multiblock copolymer is preferable for use in a rubber product requiring high fracture resistance and high weather resistance, for example, a rubber composition for a tire material or the like. Further, our rubber composition is preferable for use in a rubber product requiring high fracture resistance and high weather resistance, for example, a tire or the like.

The invention claimed is:

1. A multiblock copolymer, obtained by copolymerization of a conjugated diene compound and a non-conjugated olefin, wherein:
    a structure of the multiblock copolymer includes A-(B-A)$_x$ and/or B-(A-B)$_x$, wherein "A" represents a block portion constituted of monomer units of a non-conjugated olefin, "B" represents a block portion constituted of monomer units of a conjugated diene compound, and "x" represents an integer ≥1;
    content of the non-conjugated olefin portion is ≤30 mass %;
    storage modulus G' at 130° C., measured by rubber process analysis using a rubber process analyzer, i.e. RPA, according to ASTM D6204, is ≥20 kPa; and
    the melting point of the multiblock copolymer determined by differential scanning calorimetry measurement according to JIS K7121: 1987 is equal to or lower than 120° C.

2. The multiblock copolymer of claim 1, wherein, provided that difference between storage modulus G' at 130° C. and storage modulus G' at 100° C., calculated from torque measured by the rubber process analysis, is G'$_d$, G'$_d$ is ≤100 kPa.

3. The multiblock copolymer of claim 1, wherein, provided that difference between storage modulus G' at 130° C. and storage modulus G' at 100° C., calculated from torque measured by the rubber process analysis, is G'$_d$, 20 kPa≤G'$_d$≤100 kPa.

4. The multiblock copolymer of claim 1, wherein, provided that difference between storage modulus G' at 130° C. and storage modulus G' at 100° C., calculated from torque measured by the rubber process analysis, is G'$_d$, 20 kPa≤G'$_d$≤50 kPa.

5. A rubber composition, having as a rubber component the multiblock copolymer of claim 1.

6. A tire, having the rubber composition of claim 5.

* * * * *